(12) United States Patent
Xiong et al.

(10) Patent No.: US 12,080,899 B1
(45) Date of Patent: Sep. 3, 2024

(54) END COVER ASSEMBLY, ENERGY-STORAGE APPARATUS, AND ELECTRICITY-CONSUMPTION DEVICE

(71) Applicants: Shenzhen Hithium Energy Storage Technology Co., Ltd., Guangdong (CN); Xiamen Hithium Energy Storage Technology Co., Ltd., Fujian (CN)

(72) Inventors: Yongfeng Xiong, Guangdong (CN); Jinqiang Chen, Guangdong (CN)

(73) Assignees: Shenzhen Hithium Energy Storage Technology Co., Ltd., Guangdong (CN); Xiamen Hithium Energy Storage Technology Co., Ltd., Fujian (CN)

( * ) Notice: Subject to any disclaimer, the term of this patent is extended or adjusted under 35 U.S.C. 154(b) by 0 days.

(21) Appl. No.: 18/393,146

(22) Filed: Dec. 21, 2023

(30) Foreign Application Priority Data

Feb. 9, 2023 (CN) .......................... 202310091045.3

(51) Int. Cl.
*H01M 50/15* (2021.01)
*H01M 50/103* (2021.01)
(Continued)

(52) U.S. Cl.
CPC ......... *H01M 50/15* (2021.01); *H01M 50/103* (2021.01); *H01M 50/367* (2021.01); *H01M 50/383* (2021.01); *H01M 50/3425* (2021.01)

(58) Field of Classification Search
None
See application file for complete search history.

(56) References Cited

U.S. PATENT DOCUMENTS

| 2019/0067664 A1 | 2/2019 | Kwak |
| 2019/0221877 A1 | 7/2019 | Li et al. |

(Continued)

FOREIGN PATENT DOCUMENTS

| CN | 106450048 A | 2/2017 |
| CN | 206349416 U | 7/2017 |

(Continued)

OTHER PUBLICATIONS

WIPO, International Search Report and Written Opinion for International Patent Application No. PCT/CN2023/075286, Oct. 27, 2023, 14 pages.

(Continued)

*Primary Examiner* — Jonathan Crepeau
(74) *Attorney, Agent, or Firm* — IP Spring

(57) ABSTRACT

An end cover assembly, an energy-storage apparatus, and an electricity-consumption device are provided. A main body plate of an insulation holder includes a first surface and a second surface. A first wall plate and a second wall plate of the holder are both provided on the first surface and opposite to each other in the length direction of the main body plate. The first wall plate bends and extends away from the second wall plate in the thickness direction of the main body plate. The second wall plate bends and extends away from the first wall plate in the thickness direction of the main body plate. The main body plate, the first wall plate, and the second wall plate jointly define a receiving space to receive the explosion-proof-valve holder, and are all spaced apart from the explosion-proof-valve holder to form an airflow channel.

20 Claims, 8 Drawing Sheets

(51) Int. Cl.
    *H01M 50/342*     (2021.01)
    *H01M 50/367*     (2021.01)
    *H01M 50/383*     (2021.01)

(56) References Cited

U.S. PATENT DOCUMENTS

| | | |
|---|---|---|
| 2021/0028426 A1 | 1/2021 | Tang et al. |
| 2021/0074963 A1 | 3/2021 | Zhang et al. |
| 2022/0109212 A1 | 4/2022 | Bai |

FOREIGN PATENT DOCUMENTS

| | | |
|---|---|---|
| CN | 206541867 U | 10/2017 |
| CN | 208580773 U | 3/2019 |
| CN | 212874611 U | 4/2021 |
| CN | 212934728 U | 4/2021 |
| CN | 217562788 U | 10/2022 |
| CN | 217719776 U | 11/2022 |
| CN | 218414679 U | 1/2023 |

OTHER PUBLICATIONS

CNIPA, First Office Action for corresponding Chinese Patent Application No. 202310091045.3, May 5, 2023, 18 pages.
CNIPA, Second Office Action for corresponding Chinese Patent Application No. 202310091045.3, May 28, 2023, 19 pages.
CNIPA, Notice of Allowance for corresponding Chinese Patent Application No. 202310091045.3, Jun. 8, 2023, 9 pages.

END COVER ASSEMBLY, ENERGY-STORAGE APPARATUS, AND ELECTRICITY-CONSUMPTION DEVICE

CROSS-REFERENCE TO RELATED APPLICATIONS

This application claims priority under 35 U.S.C. § 119(a) to Chinese Patent Application No. 202310091045.3, filed Feb. 9, 2023, the entire disclosure of which is incorporated herein by reference.

TECHNICAL FIELD

This disclosure relates to the field of energy-storage technologies, and in particular, to an end cover assembly, an energy-storage apparatus, and an electricity-consumption device.

BACKGROUND

Energy-storage apparatuses may be configured to store energy and release energy when required. Current energy-storage apparatuses are mainly rechargeable secondary batteries. At present, a common secondary battery may mainly include a housing, an electrode assembly, and a cover assembly. The electrode assembly is received in the housing. The housing is enclosed by the cover assembly. A tab of the electrode assembly is connected to a terminal post on the cover assembly

SUMMARY

An end cover assembly, an energy-storage apparatus, and an electricity-consumption device are provided in the disclosure.

In a first aspect, an end cover assembly is provided in the disclosure. The end cover assembly is for an energy-storage apparatus. The end cover assembly includes an explosion-proof-valve holder and an insulation holder. The insulation holder includes a main body plate, a first wall plate, and a second wall plate. The main body plate includes a first surface and a second surface. The second surface faces an electrode assembly of the energy-storage apparatus. The first wall plate and the second wall plate are provided on the first surface and opposite to each other in a length direction of the main body plate. The first wall plate extends away from the second wall plate in a thickness direction of the main body plate. The second wall plate extends away from the first wall plate in the thickness direction of the main body plate. The main body plate, the first wall plate, and the second wall plate jointly define a receiving space. The receiving space is used for receiving the explosion-proof-valve holder. The main body plate, the first wall plate, and the second wall plate are all spaced apart from the explosion-proof-valve holder to form a first airflow channel. The first wall plate and the second wall plate are both spaced apart from the explosion-proof-valve holder by a spacing distance S1 ranging from 0.95 mm to 2.65 mm in the length direction of the main body plate. The insulation holder includes a first holder and a second holder, where the first holder and the second holder are in mirror symmetry, the first holder is spaced apart from the second holder to form a second airflow channel, and the first holder is spaced apart from the second holder by a spacing distance S3 ranging from 1.6 mm to 5.25 mm. The main body plate defines a vent hole, where an inner wall of the vent hole is recessed in the length direction of the main body plate to define a first notch. The explosion-proof-valve holder includes a baffle, where the baffle faces the main body plate and the vent hole, an edge of the baffle is recessed in the length direction of the main body plate to define a second notch, and the first notch is aligned with the second notch in the thickness direction of the main body plate.

In a second aspect, an energy-storage apparatus is further provided in the disclosure. The energy-storage apparatus includes an electrode assembly, a housing, and the end cover assembly in the first aspect. The electrode assembly is located in the housing. The end cover assembly is electrically connected to the electrode assembly.

In a third aspect, an electricity-consumption device is further provided in the disclosure. The electricity-consumption device includes the energy-storage apparatus in the second aspect. The energy-storage apparatus is configured to power the electricity-consumption device.

BRIEF DESCRIPTION OF THE DRAWINGS

In order to describe technical solutions in embodiments of the disclosure or in the related art more clearly, the following will give a brief introduction to accompanying drawings for describing embodiments or the related art. The accompanying drawings hereinafter described merely illustrate some embodiments of the disclosure. Based on these drawings, those of ordinary skills in the art can also obtain other drawings.

ILLUSTRATION OF REFERENCE SIGNS IN THE ACCOMPANYING DRAWINGS

Figure 1:
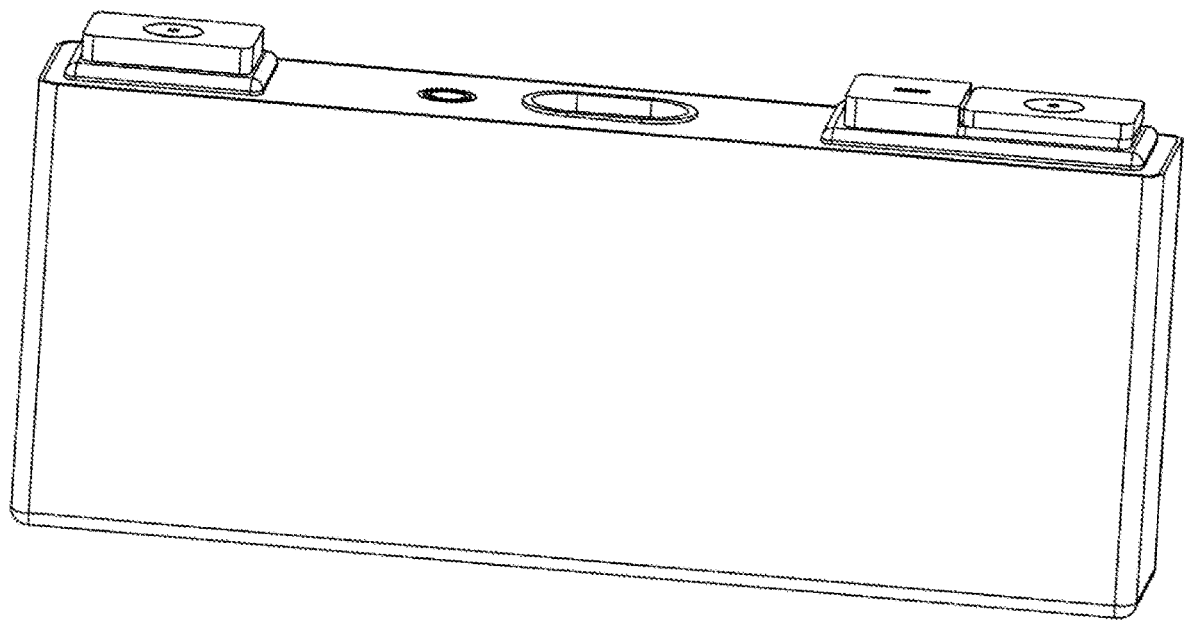
FIG. 1 is a perspective view of an energy-storage apparatus in an embodiment.

1—electricity-consumption device; 100—energy-storage apparatus, 10—end cover assembly, 20—electrode assembly, 30—housing;
11—insulation holder, 111—main body plate, 1111—first surface, 1112—second surface, 1113—vent plate, 1113A—first vent plate, 1113B—second vent plate, 1114—vent hole, 1114A—air sub-hole, 1115—rib, 1116—support plate, 1116A—left support plate, 1116B—right support plate, 1117—third surface, 112—first wall plate, 1121—first curved plate, 1121A—first plate, 1121 B—second plate, 1122—second curved plate, 1122A—third plate, 1122B—fourth plate, 1123—fourth surface, 113—second wall plate, 114, 114A, 114B—receiving space, 115—first airflow channel, 116—lateral plate, 1161—connection surface, 117—protrusion, 118—first notch, 119—fastener, 11A—first holder, 11B—second holder, 11S—second airflow channel;

12—explosion-proof-valve holder, 121—second notch, 122—baffle, 123—first connection plate, 124—second connection plate, 125—fixing hole, 13—insulation member, 13A—positive-electrode cover plate, 13B—negative-electrode cover plate, 131—base, 132—side plate, 133—liquid injection hole, 134—third notch, 14—main cover plate;

α—first included angle, β—second included angle, γ—third included angle, δ—fourth included angle, η—fifth included angle.

DETAILED DESCRIPTION

The following will illustrate clearly technical solutions of embodiments of the disclosure with reference to accompanying drawings of embodiments of the disclosure. Embodiments illustrated herein are merely some, rather than all embodiments, of the disclosure. Based on the embodiments of the disclosure, other embodiments obtained by those of ordinary skill in the art shall fall within the protection scope of the disclosure.

It is to be noted that, when a component (element or member) is deemed as being "fixed" or "secured" to another component (element or member), the component (element or member) can be directly on the other component (element or member) or there may be an intermediate component (element or member) between the two components (elements or members). When a component (element or member) is considered to be "connected" or "coupled" to another component (element or member), the component (element or member) may be directly connected or coupled to the other component (element or member) or there may be an intermediate component (element or member) between the two components (elements or members).

Unless otherwise defined, all technical and scientific terms used herein have the same meaning as commonly understood by those skilled in the art of the disclosure. The terms used herein in the disclosure are for the purpose of describing specific embodiments only and are not intended to limit the disclosure. The term "and/or" used herein includes any and all combinations of one or more related listed items.

The following will describe in detail some embodiments of the disclosure with reference to the accompanying drawings. The following embodiments and features in the embodiments can be combined with each other without conflict.

In a secondary battery, due to its own manufacturing defects or under excitation of external temperature abnormalities, mechanical abnormalities, charging abnormalities, etc., irreversible side reactions, such as solid electrolyte interphase (SEI) film decomposition, positive-electrode material decomposition, and electrolyte decomposition, may occur inside the battery, and thus a large amount of heat may be generated, and small molecular gases may be released. Under special conditions (such as high temperature, short circuit, vibration, extrusion, and impact), gas expansion or smoke may easily occur, and fire or other thermal runaway may even occur, and thus there may be a certain safety hazard.

Figure 2:
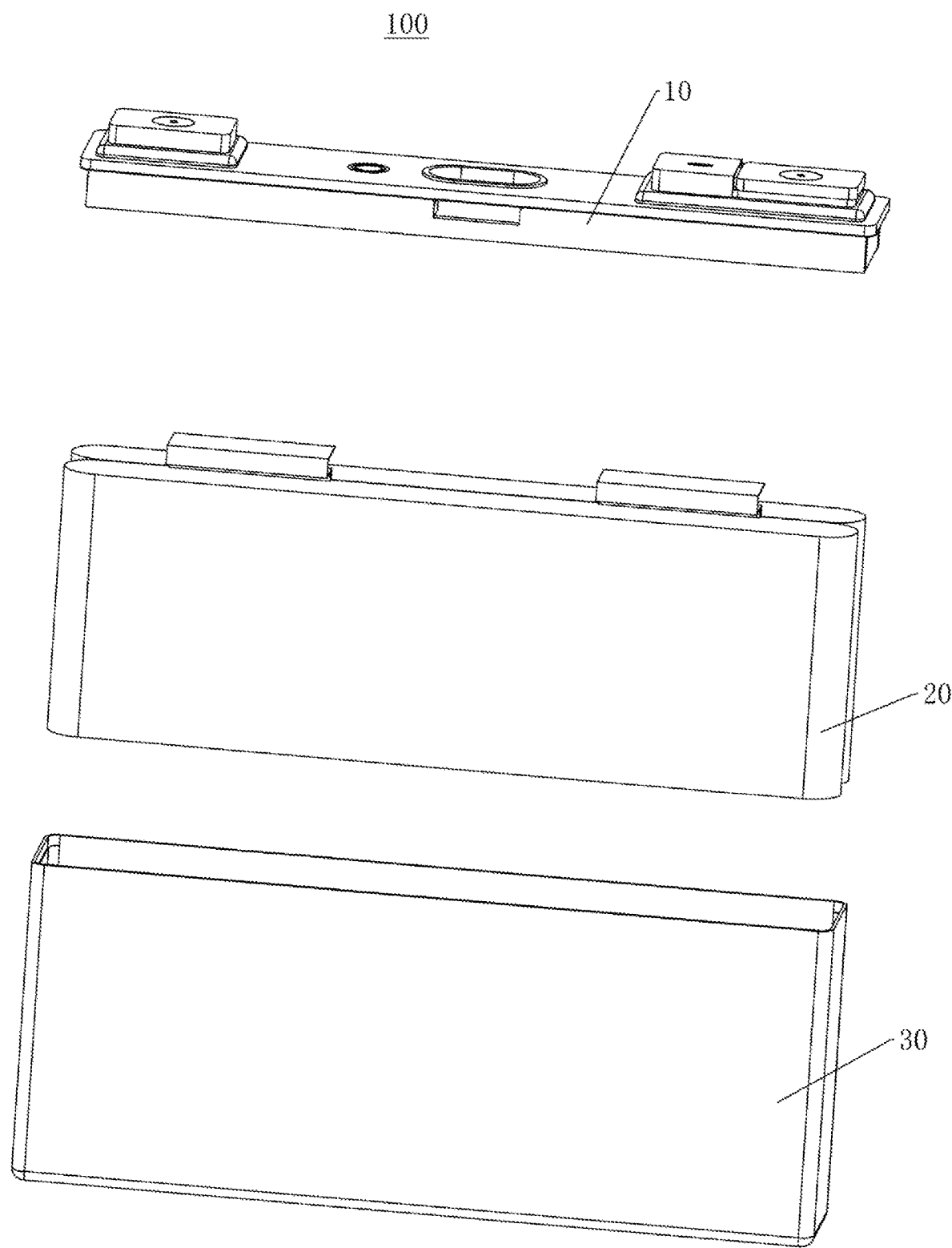
FIG. 2 is an exploded view of an energy-storage apparatus in an embodiment.

An energy-storage apparatus 100 is provided in embodiments of the disclosure to improve safety performance. As illustrated in FIG. 1 and FIG. 2, the energy-storage apparatus 100 includes an electrode assembly 20, a housing 30, and an end cover assembly 10. The electrode assembly 20 is located in the housing 30. The end cover assembly 10 is electrically connected to the electrode assembly 20. The end cap assembly 10 covers an opening of the housing 30 to enclose the housing 30.

Figure 3:
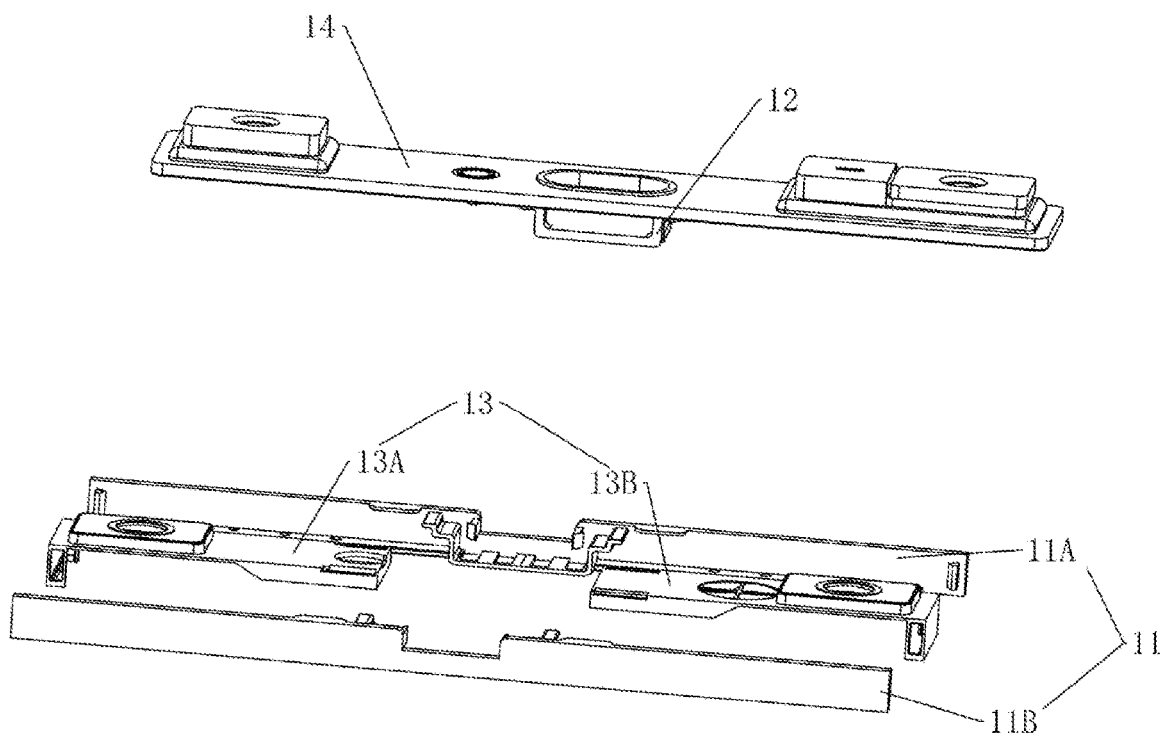
FIG. 3 is an exploded view of an end cap assembly in an embodiment.

Optionally, as illustrated in FIG. 3, the end cover assembly 10 includes a main cover plate 14 and an explosion-proof-valve holder 12. The middle of the main cover plate 14 defines an explosion-proof opening (not illustrated) for mounting an explosion-proof sheet (not illustrated). The explosion-proof sheet is fixed in the explosion-proof opening of the main cover plate 14 to seal the explosion-proof opening. For example, the explosion-proof sheet may be fixed in the explosion-proof opening of the main cover plate 14 via soldering. The explosion-proof-valve holder 12 may be made of a metal material.

Figure 4:
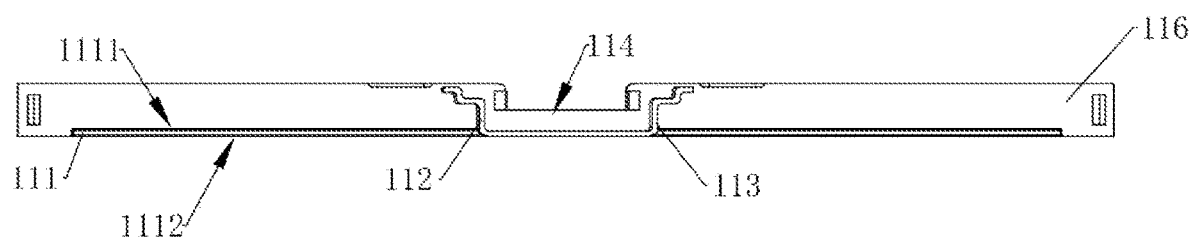
FIG. 4 is a front view of an insulation holder in an embodiment.
Figure 5:
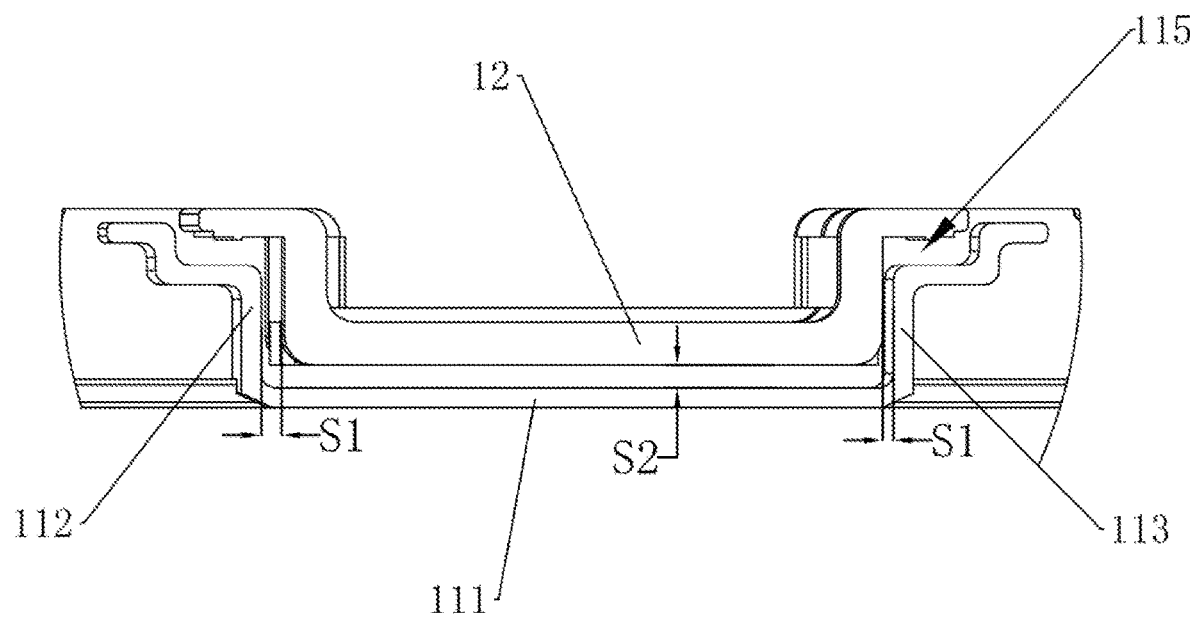
FIG. 5 is a front view illustrating a main body plate, a first wall plate, a second wall plate, and an explosion-proof-valve holder in an embodiment.

An insulation holder 11 in the energy-storage apparatus 100 is provided in embodiments of the disclosure. As illustrated in FIG. 4 and FIG. 5, the insulation holder 11 is a portion of the end cover assembly 10. The insulation holder 11 includes a main body plate 111, a first wall plate 112, and a second wall plate 113.

The insulation holder 11 is made of an insulation material, and may specifically be made of plastic, such as polypropylene (PP). The main body plate 111 includes a first surface 1111 and a second surface 1112 opposite to the first surface 1111. The second surface 1112 faces the electrode assembly 20 of the energy-storage apparatus 100. The main body plate 111 is in a shape of a plate and has a convex plate-surface. The main body plate 111 has a length, a width, and a thickness. In subsequent illustration of various structures, an extension direction of the length of the main body plate 111 serves as a length direction, an extension direction of the width of the main body plate 111 serves as a width direction, and an extension direction of the thickness of the main body plate 111 serves as a thickness direction. The first surface 1111 is opposite to the second surface 1112 in the thickness direction. The main cover plate 14 faces the first surface 1111. The main cover plate 14 may be parallel to the main body plate 111. The explosion-proof-valve holder 12 is located between the main body plate 111 and the main cover plate 14.

The first wall plate 112 and the second wall plate 113 are provided on the first surface 1111 and opposite to each other in the length direction of the main body plate 111. The main body plate 111 is divided into a left part, a middle part, and a right part sequentially in the length direction. The first wall plate 112 and the second wall plate 113 are connected to the middle part. The first wall plate 112 and the second wall plate 113 both are in a shape of a plate. The first wall plate 112, the second wall plate 113, and the main body plate 111 may be integrally formed, for example, be integrally formed through injection molding.

The first wall plate 112 bends and extends away from the second wall plate 113 in the thickness direction of the main body plate 111. The second wall plate 113 bends and extends away from the first wall plate 112 in the thickness direction of the main body plate 111. The main body plate 111, the first wall plate 112, and the second wall plate 113 jointly define a receiving space 114. The receiving space 114 is used for receiving the explosion-proof-valve holder 12. The main body plate 111, the first wall plate 112, and the second wall plate 113 are all spaced apart from the explosion-proof-valve holder 12 to form a first airflow channel 115.

Optionally, a curved extension path of the first wall plate 112 may be wave-like or serrated. A curved extension path of the second wall plate 113 may be wave-like or serrated. The shape of the curved extension path of the first wall plate 112 may be the same as or different from the shape of the curved extension path of the second wall plate 113.

Optionally, as illustrated in FIG. 5, a size of the explosion-proof-valve holder 12 may be smaller than a volume of the receiving space 114, and a shape of the explosion-proof-valve holder 12 may be similar to a shape of the receiving space 114, so that the main body plate 111, the first wall plate 112, and the second wall plate 113 are all spaced apart from the explosion-proof-valve holder 12 to form the first airflow channel 115. Furthermore, in a cross-sectional view of the end cover assembly 10 taken along the thickness direction of the main body plate 111, the first airflow channel 115 may be curved.

It can be understood that, in the case where the explosion-proof-valve holder 12 is located in the receiving space 114, the receiving space 114 is divided by the explosion-proof-valve holder 12 to form the first airflow channel 115, so the first airflow channel 115 is always part of the receiving space 114.

Optionally, the first airflow channel 115 may extend in a shape of a Chinese character "几" or a letter "U". It can be understood that, since the first airflow channel 115 is defined by the main body plate 111, the first wall plate 112, the second wall plate 113, and the explosion-proof-valve holder 12, the extension shape of the first airflow channel 115 may be similar to the shape of the cross section of the whole formed by the main body plate 111, the first wall plate 112, and the second wall plate 113 that are connected together.

The first wall plate 112 and the second wall plate 113 facing the first wall plate 112 are provided on the main body plate 111, the main body plate 111, the first wall plate 112, and the second wall plate 113 jointly define the receiving space 114, and the explosion-proof-valve holder 12 is received in the receiving space 114, and thus the explosion-proof-valve holder 12 may be surrounded and protected by the main body plate 111, the first wall plate 112, and the second wall plate 113. Furthermore, the explosion-proof-valve holder 12 may be isolated from the electrode assembly 20 by the main body plate 111, the first wall plate 112, and the second wall plate 113, and thus the explosion-proof-valve holder 12 may be prevented from contacting the electrode assembly 20 to avoid short circuit, and impurities outside the explosion-proof-valve holder 12 may be prevented from entering the electrode assembly 20. Meanwhile, in the disclosure, both the first wall plate 112 and the second wall plate 113 are curved, so that the curved first airflow channel 115 may be formed among the explosion-proof-valve holder 12, the main body plate 111, the first wall plate 112, and the second wall plate 113 in the case where the explosion-proof-valve holder 12 is received in the receiving space 114, so as to facilitate sufficient air flow. In addition, the first wall plate 112 extends away from the second wall plate 113, and the second wall plate 113 extends away from the first wall plate 112, and thus the first airflow channel 115 at the first wall plate 112 and the second wall plate 113 may be sloped, which may facilitate air convergence in a space between the explosion-proof-valve holder 12 and the main cover plate 14.

In an embodiment, as illustrated in FIG. 5, the first wall plate 112 and the second wall plate 113 are both spaced apart from the explosion-proof-valve holder 12 by a spacing distance S1 ranging from 0.15 mm to 2.65 mm in a length direction of the main body plate 111. Specifically, the spacing distance S1 may be 0.95 mm, 1.05 mm, 1.1 mm, 1.25 mm, or 1.3 mm. With aid of the spacing distance S1 that is in the range, it may facilitate flow of air to the receiving space 114 through the first airflow channel 115, and other foreign matters can be prevented from entering the airflow channel. In the case where the spacing distance S1 is less than 0.15 mm, the spacing is too small to form an airflow channel for air to flow freely. In the case where the spacing distance S1 is greater than 2.65 mm, the spacing is too large, and thus foreign matters in the end cover assembly 10, such as a broken tab or a broken insulation film, may easily enter the airflow channel and drift into the receiving space 114 in an airflow direction, resulting in failure of the explosion-proof valve.

Figure 6:
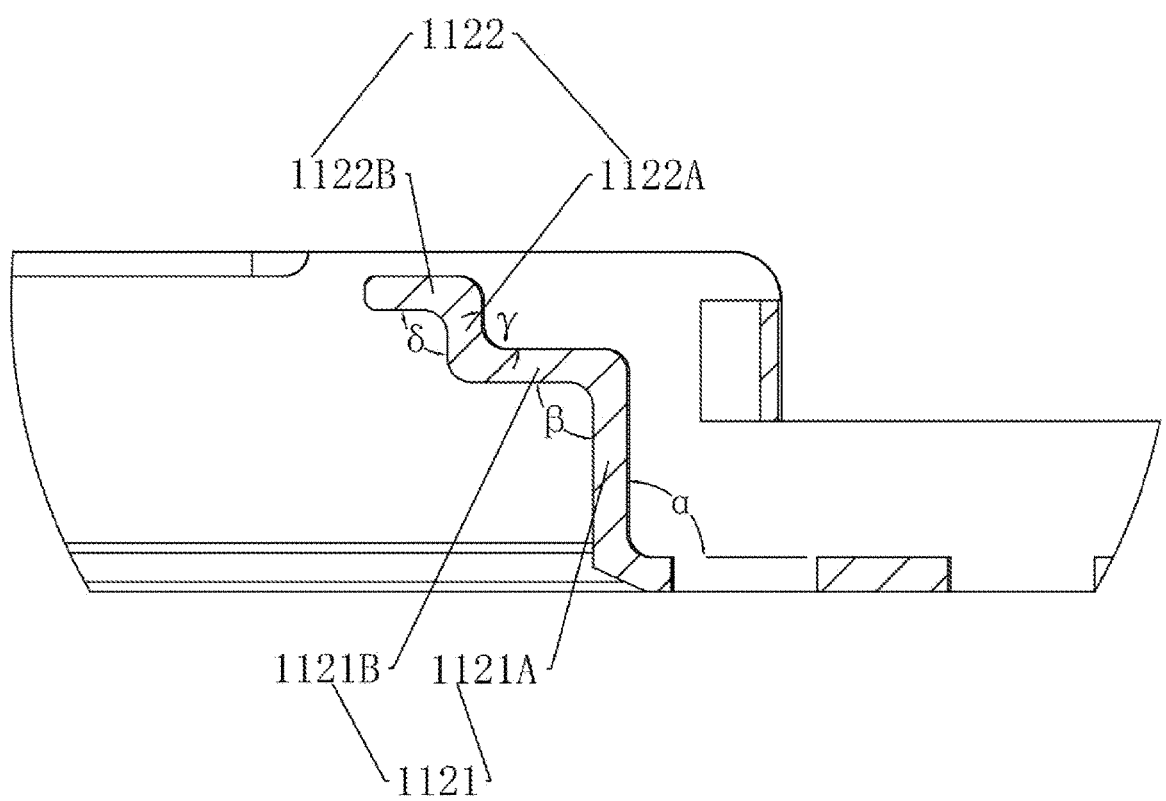
FIG. 6 is a front view illustrating a first wall plate in an embodiment.

In an embodiment, as illustrated in FIG. 6, the first wall plate 112 includes a first curved plate 1121 and a second curved plate 1122. One end of the first curved plate 1121 is connected to the first surface 1111, and another end of the first curved plate 1121 extends away from the second wall plate 113. One end of the second curved plate 1122 is connected to one end of the first curved plate 1121 away from the main body plate 111, i.e., connected to the another end of the first curved plate 1121 extending away from the second wall plate 113, and another end of the second curved plate 1122 extends away from the second wall plate 113.

Specifically, in a cross-sectional view of the first curved plate 1121 and the second curved plate 1122 taken along the thickness direction of the main body plate 111, the cross section of the first curved plate 1121 and the cross section of the second curved plate 1222 may both be in a shape of a smooth curve. It may be understood that, by means of that the first curved plate 1121 and the second curved plate 1122 both are in the shape of a smooth curve, it may be beneficial for smooth air flow, and thus air turbulence in the first airflow channel 115 may be avoided. Meanwhile, since the first curved plate 1121 and the second curved plate 1122 are both in the shape of a smooth curve, scratching of the first wall plate 112 may be avoided in use and accordingly burrs on the first wall plate 112 may be avoided.

Optionally, the cross section of the first curved plate 1121 and the cross section of the second curved plate 1122 may both have a sharp angle. It may be understood that, the holder 11 may be formed by inversion molding. In the case where the first curved plate 1121 and the second curved plate 1122 both have a sharp angle, edge chamfering for a mold may be not needed, and thus it may facilitate manufacturing of the mold.

Optionally, the shape of the cross section of the first curved plate 1121 may be the same as or different from the shape of the cross section of the second curved plate 1122. For example, the cross section of the first curved plate 1121 may have a sharp angle, and the cross section of the second curved plate 1122 may be in a shape of a smooth curve, which may be specifically designed according to requirements.

Optionally, the second wall plate 113 may include a third curved plate (not illustrated) and a fourth curved plate (not illustrated). One end of the third curved plate is connected to the first surface 1111, and another end of the third curved plate extends away from the first wall plate 112. One end of the fourth curved plate is connected to one end of the third curved plate away from the main body plate 111, and another end of the fourth curved plate extends away from the first wall plate 112. Furthermore, the cross section of the third curved plate may be in a shape of a smooth curve or have a sharp angle, and the cross section of the fourth curved plate may be in a shape of a smooth curve or have a sharp angle.

The first wall plate 112 includes the first curved plate 1121 and the second curved plate 1122, one end of the first curved plate 1121 extends away from the second wall plate 113, and one end of the second curved plate 1122 extends away from the second wall plate 113, and thus the first wall plate 112 may have a structure of at least two steps, facilitating uniform and smooth air flow.

In an embodiment, as illustrated in FIG. 6, the first curved plate 1121 may include a first plate 1121A and a second plate 1121B connected with each other at an angle. The first plate 1121A is connected to the first surface 1111 and extends in the thickness direction of the main body plate 111. The second plate 1121B extends away from the second wall plate 113.

Specifically, the first plate 1121A and the main body plate 111 are connected with each other at an angle. Optionally, a connection angle defined between the first plate 1121A and the main body plate 111 may be a first angle α that may be 90°. Alternatively, the first angle α may be 80°, 85°, 95°, or 100°. It can be understood that the first plate 1121A is connected to the first surface 1111 and may extend in the thickness direction of the main body plate 111. The angle defined between the first plate 1121A and the main body plate 111 may not be limited, but the angle may not be too large or too small. In the case where the connection angle defined between the first plate 1121A and the main body plate 111 is too large or too small, the first wall plate 112 has an insufficient size in the thickness direction of the main body plate 111, and thus the first wall plate 112 as a whole has relatively poor support for the insulation holder 11, so that the insulation holder 11 is insufficiently stable.

Optionally, the second plate 1121B and the first plate 1121A are connected with each other at an angle. Optionally, a connection angle defined between the second plate 1121B and the first plate 1121A may be a second angle f that may be 100°. Alternatively, the second included angle β may be 90°, 95°, 105°, or 110°. It may be understood that the second plate 1121B is connected to a surface of the first plate 1121A away from the second wall plate 113 and extends away from the second wall plate 113, and the angle defined between the second plate 1121B and the first plate 1121A may not be limited. In the case where the second angle f is greater than 90°, it may facilitate air flow in the first airflow channel 115, so that air tends to flow towards the main body plate 111. However, the connection angle defined between the second plate 1121B and the first plate 1121A may not be too large or too small. In the case where the connection angle is too small, the second plate 1121B is too close to the surface of the first plate 1121A away from the second wall plate 113, resulting in that the curved first airflow channel 115 cannot be formed. In the case where the connection angle is too large, the second plate 1121B is substantially parallel to the first plate 1121A, resulting in that the curved first air flow channel 115 cannot be formed.

Optionally, two opposite surfaces of the first plate 1121A may be flat surfaces that are parallel to each other, or one of the two opposite surfaces of the first plate 1121A may be a curved surface that is outwardly convex, or both of the two opposite surfaces of the first plate 1121A may be curved surfaces that are outwardly convex. Two opposite surfaces of the second plate 1121B may be flat surfaces that are parallel to each other, or one of the two opposite surfaces of the second plate 1121B may be a curved surface that is outwardly convex, or both of the two opposite surfaces of the second plate 1121B may be curved surfaces that are outwardly convex.

The first plate 1121A and the second plate 1121B may be connected with each other at a right angle, so that it may facilitate matching of an appearance structure of the explosion-proof-valve holder 12 with the structure of the first plate 1121A and the second plate 1121B, thereby forming the first airflow channel 115. Meanwhile, the first plate 1121A extends in the thickness direction of the main body plate 111, and the second plate 1121B extends away from the second wall plate 113, so that the first curved plate 1121 has a stepped structure, which may be beneficial for air to flow to the space between the explosion-proof-valve holder 12 and the main cover plate 14.

In an embodiment, as illustrated in FIG. 6, the second curved plate 1122 may include a third plate 1122A and a fourth plate 1122B connected with each other at an angle. The third plate 1122A extends in the thickness direction of the main body plate 111, and the third plate 1122A and the first curved plate 1121 are connected with each other at an angle. The fourth plate 1122B extends away from the second wall plate 113.

Specifically, the third plate 1122A and the second plate 1121B are connected with each other at an angle. Optionally, a connection angle defined between the third plate 1122A and the second plate 1121B may be a third angle γ that may be 90°. Alternatively, the third angle γ may be 80°, 85°, 95°, or 100°. It can be understood that the third plate 1122A is connected to a surface of the second plate 1121B away from the main body plate 111 and may extend in the thickness direction of the main body plate 111. The angle defined between the third plate 1122A and the second plate 1121B may not be limited, but the angle may not be too large or too small. In the case where the connection angle defined between the third plate 1122A and the second plate 1121B is too large or too small, the curved first airflow channel 115 cannot be formed, and the first wall plate 112 has an insufficient size in the thickness direction of the main body plate 111, and thus the first wall plate 112 as a whole has relatively poor support for the holder 11.

Optionally, the fourth plate 1122B and the third plate 1122A are connected with each other at an angle. Optionally, a connection angle defined between fourth plate 1122B and the third plate 1122A may be a fourth angle δ that may be 100°. Alternatively, the fourth angle δ may be 90°, 95°, 105°, or 110°. It may be understood that the fourth plate 1122B is connected to a surface of the third plate 1122A away from the second wall plate 113 and extends away from the second wall plate 113, and the angle defined between the fourth plate 1122B and the third plate 1122A may not be limited. In the case where the fourth included angle δ is greater than 90°, it may facilitate air flow in the first airflow channel 115, so that air tends to flow towards the main body plate 111. However, the connection angle defined between the fourth plate 1122B and the third plate 1122A may not be too large or too small. In the case where the connection angle defined between the fourth plate 1122B and the third plate 1122A is too large or too small, the curved first airflow channel 115 cannot be formed.

Optionally, two opposite surfaces of the third plate 1122A may be flat surfaces that are parallel to each other, or one of the two opposite surfaces of the third plate 1122A may be a curved surface that is outwardly convex, or both of the two opposite surfaces of the third plate 1122A may be curved surfaces that are outwardly convex. Two opposite surfaces of the fourth plate 1122B may be flat surfaces that are parallel to each other, or one of the two opposite surfaces of the fourth plate 1122B may be a curved surface that is outwardly convex, or both of the two opposite surfaces of the fourth plate 1122B may be curved surfaces that are outwardly convex.

The third plate 1122A and the fourth plate 1122B may be connected with other at a right angle, or the connection angle defined between the fourth plate 1122B and the third plate 1122A may be 100°, so that the fourth plate 1122B and the third plate 1122A may form a sloped step, and thus air around the fourth plate 1122B may easily flow downwards to the first curved plate 1121 through the sloped step, thereby improving mobility of air and air convergence.

Figure 7:
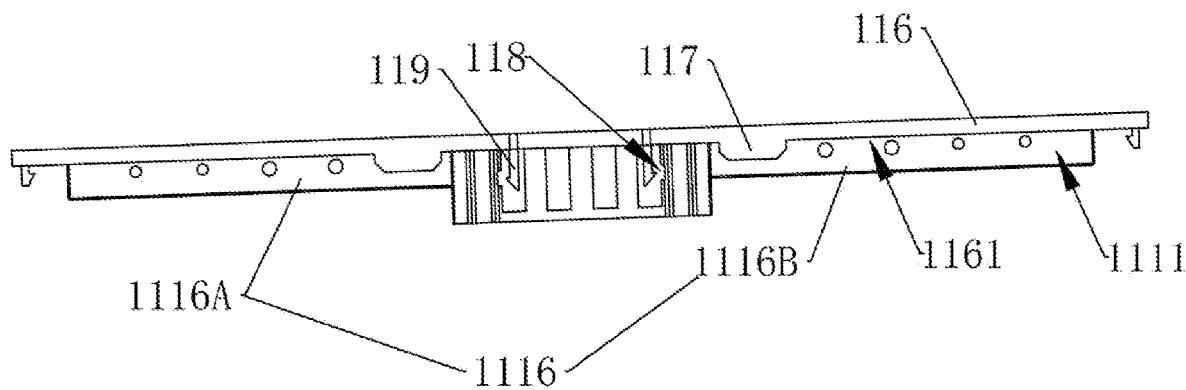
FIG. 7 is a top view of an insulation holder in an embodiment.

In an embodiment, as illustrated in FIG. 7, the insulation holder 11 may further include a lateral plate 116. The lateral plate 116 is connected to one end of the main body plate 111 in the width direction of the main body plate 111. The lateral plate 116 extends in the thickness direction of the main body plate 111. The main body plate 111 has a chamfered edge at an end away from the lateral plate 116.

Specifically, the lateral plate 116 and the main body plate 111 are connected with each other at an angle. Optionally, a connection angle defined between the lateral plate 116 and the main body plate 111 may be 90°. The lateral plate 116 extends in the thickness direction of the main body plate 111. The first wall plate 112 and the second wall plate 113 both are connected to the lateral plate 116. The lateral plate 116, the first wall plate 112, and the second wall plate 113 jointly define the receiving space 114.

Optionally, the main body plate 111 has a first edge (not illustrated), a second edge (not illustrated), and a third edge (not illustrated) that are connected in sequence. The lateral plate 116 is connected to the third edge of the main body plate 111. The third edge is opposite to the first edge. Both the second edge and the first edge may be a chamfered edge, so that during assembling the holder 11 to the housing 30, a tab can be prevented from being scratched to avoid breakage of the tab.

The insulation holder 11 is provided with the lateral plate 116 that is connected to the main body plate 111, and the lateral plate 116 is connected to both the first wall plate 112 and the second wall plate 113, so that the lateral plate 116 may support and reinforce both the first wall plate 112 and the second wall plate 113 and can also protect other components of the end cover assembly 10 from the side. The main body plate 111 has a chamfered edge at an end away from the lateral plate 116, so that an excessive sharp edge of the main body plate 111 may be avoided, thereby avoiding scratching and breakage of the tab during assembly.

In an embodiment, as illustrated in FIG. 7, the insulation holder 11 may further include a protrusion 117. The protrusion 117 is connected to one end of the lateral plate 116 away from the main body plate 111. The protrusion 117 protrudes from the lateral plate 116 in the width direction of the main body plate 111 and faces the main body plate 111. An orthographic projection of the protrusion 117 on the main body plate 111 is in a shape of a trapezoid.

Specifically, the lateral plate 116 may have a connection surface 1161. The first wall plate 112 and the second wall plate 113 both are connected to the connection surface 1161. The protrusion 117 is connected to the connection surface 1161 and located at one end of the connection surface 1161 away from the main body plate 111. The protrusion 117 is in butt joint with an insulation member 13.

Optionally, the protrusion 117 protrudes from the connection surface 1161 in the width direction of the main body plate 111 and faces the main body plate 111. It may be understood that the protrusion 117 may be in a shape of a plate, and a plate surface of the protrusion 117 may be parallel to the plate surface of the main body plate 111.

Optionally, the orthographic projection of the protrusion 117 on the main body plate 111 is in the shape of a trapezoid and may specifically be in a shape of a right trapezoid. In addition, a relatively long bottom edge of the protrusion 117 may be connected to the lateral plate 116. Therefore, the protrusion 117 has a tapered shape, tapering in a direction away from the lateral plate 116.

Optionally, the orthographic projection of the protrusion 117 on the main body plate 111 may be in a shape of a hexagon. Specifically, the protrusion 117 may have a chamfer at an end away from the lateral plate 116.

The holder 11 is provided with the protrusion 117 and the protrusion 117 is connected to the lateral plate 116, so that the protrusion 117 may be used for butt joint with other components of the end cover assembly 10, thereby enhancing stability of the end cover assembly 10. Meanwhile, the orthographic projection of the protrusion 117 on the main body plate 111 is in the shape of a trapezoid, so that it may facilitate smooth butt joint with the protrusion 117, thereby improving reliability of the end cover assembly 10 during assembly of the end cover assembly 10.

In an embodiment, one end of the first wall plate 112 away from the main body plate 111 is spaced apart from the protrusion 117 by a spacing distance in the thickness direction of the main body plate 111. Specifically, the first wall plate 112 may not exceed the lateral plate 116 in the thickness direction of the main body plate 111. It may be understood that when the first wall plate 112 and the protrusion 117 are observed in the length direction of the main body plate 111, it may be observed that one end of the first wall plate 112 may be misaligned with the protrusion 117, and the protrusion 117 does not block the first wall plate 112 in the length direction of the main body plate 111.

The end of the first wall plate 112 away from the main body plate 111 is spaced apart from the protrusion 117 by a spacing distance in the thickness direction of the main body plate 111, so that the end of the first wall plate 112 away from the main body plate 111 and the protrusion 117 are misaligned, and thus when flowing to the first wall plate 112 in the length direction of the main body panel 111, air may not be blocked by the protrusion 117, and a layered airflow channel may be formed, thereby preventing air from impacting the protrusion 117 to avoid turbulence, and thus facilitating air convergence.

Figure 8:
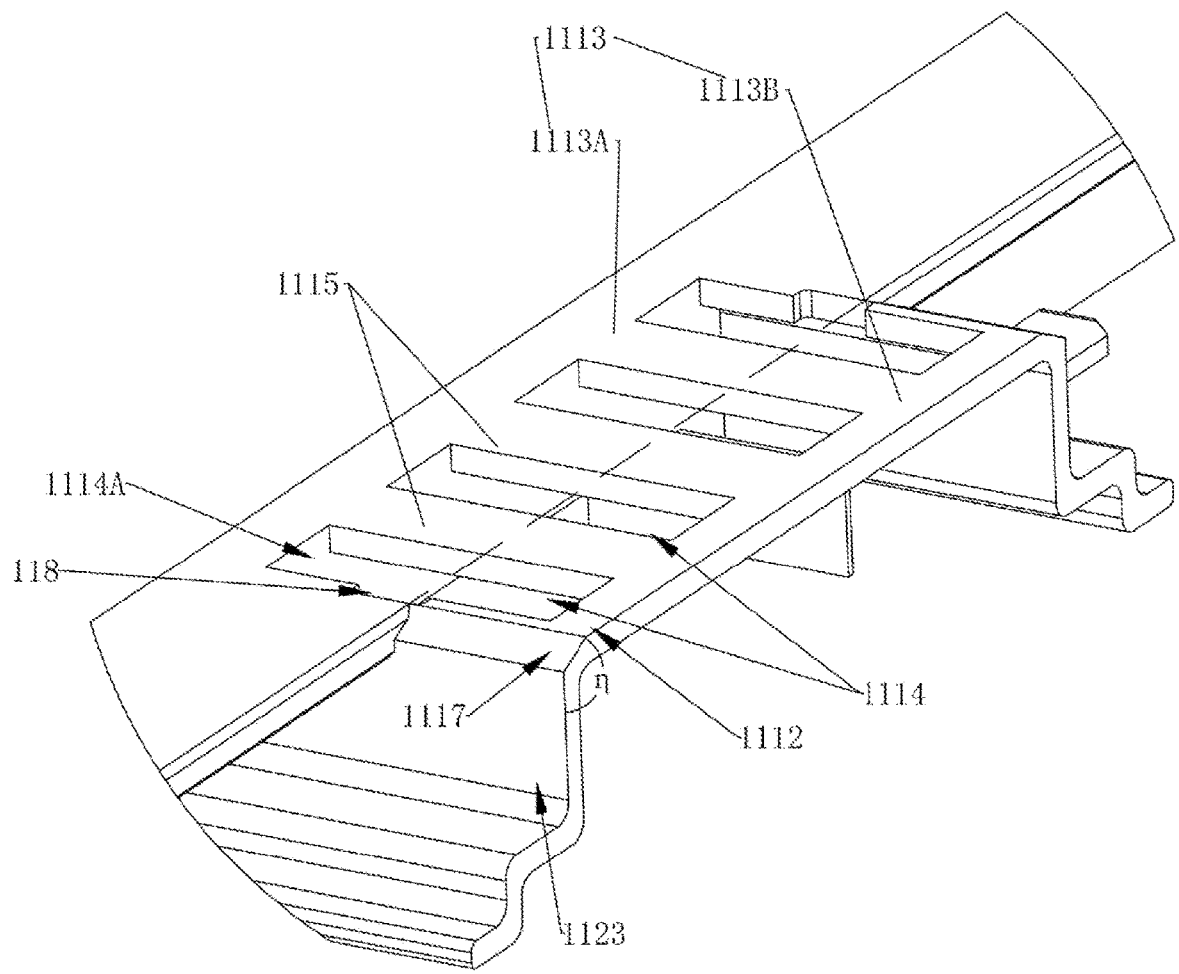
FIG. 8 is a schematic structural view illustrating a vent plate in an embodiment.

In an embodiment, as illustrated in FIG. 8, the main body plate 111 may include a vent plate 1113. The vent plate 1113 defines a vent hole 1114. The first wall plate 112 is connected to one of two opposite ends of the vent plate 1113 in a length direction of the vent plate 1113, and the second wall plate 113 is connected to the other of the two opposite ends of the vent plate 1113 in the length direction of the vent plate 1113. The first wall plate 112, the second wall plate 113, and the vent plate 1113 jointly define the receiving space 114. The vent plate 1113 is spaced apart from the explosion-proof-valve holder 12 by a spacing distance.

Specifically, the vent plate 1113 is located in the middle of the main body plate 111 and defines the vent hole 1114 that penetrates the main body plate 111 in the thickness direction of the main body plate 111, so that the receiving space 114 may be in communication with the outside. The vent hole 1114 may be in a shape of a quadrangle, a circle, an ellipse, or other polygons, which is not limited herein.

Optionally, the vent plate 1113 may include two side plates (i.e., a left side plate and a right side plate) that are opposite to each other in the length direction of the vent plate 1113. The first wall plate 112 and the left side plate may be connected with each other at an angle, the second wall plate 113 and the right side plate may be connected with each other at an angle, and for a specific angle, reference may be made to the foregoing embodiments.

Optionally, the vent plate 1113 is spaced apart from the explosion-proof-valve holder 12 by a spacing distance, and the vent hole 1114 faces the explosion-proof-valve holder 12.

It may be understood that the explosion-proof-valve holder 12 may provide buffering support for the vent plate 1113 that has a relatively low structural strength. In the case where the energy-storage apparatus 100 falls or suffers from collision, electrolyte may move upwards and the vent plate 1113 may be subject to an impact force from the electrolyte. In this case, the vent plate 1113 tilts upwards in the spacing distance to absorb energy. When the impact force is too large, the vent plate 1113 tilts upwards until the vent plate 1113 abuts against the explosion-proof-valve holder 12, so that the vent plate 1113 may be prevented from excessively tilting to avoid breakage of the vent plate 1113, thereby avoiding a broken fragment of the vent plate 1113 and accordingly avoiding scratching of the tab. Therefore, safety performance of the energy-storage apparatus 100 may be improved. The main body plate 111 includes the vent plate 1113 that is used for defining the receiving space 114, and the vent plate 1113 defines the vent hole 1114 in communication with the receiving space 114, and thus the receiving space 114 may be in communication with the outside through the vent hole 1114, so that air generated by the electrode assembly 20 may flow out of the housing 30 through the vent hole 1114.

In an embodiment, as illustrated in FIG. 5, the main body plate 111 is spaced apart from the explosion-proof-valve holder 12 by a spacing distance S2 ranging from 0.25 mm to 3.45 mm. Specifically, the spacing distance S2 may be 1.3 mm, 1.4 mm, 1.5 mm, 1.6 mm, or 1.7 mm. With aid of the spacing distance S2 that is in the range, it may facilitate flow of air to the receiving space 114 through the first airflow channel 115, and other foreign matters may be prevented from entering the airflow channel. In the case where the spacing distance S2 is less than 0.25 mm, the spacing is too small to form an airflow channel for air to flow freely. In the case where the spacing distance S2 is greater than 3.45 mm, the spacing is too large, and thus foreign matters in the end cover assembly 10, such as a broken tab or a broken insulation film, may easily enter the airflow channel and drift into the receiving space 114 in an airflow direction, resulting in failure of the explosion-proof valve.

In an embodiment, as illustrated in FIG. 8, the insulation holder 11 may further include at least one rib 1115. The at least one rib 1115 is located in the vent hole 1114 and divides the vent hole 1114 into multiple air sub-holes 1114A.

Specifically, the rib 1115 extends in the width direction of the vent plate 1113. Two ends of the rib 1115 are respectively connected to an upper side plate and a lower side plate that jointly define the vent hole 1114. The upper side plate is connected to both the left side plate and the right side plate, and the lower side plate is connected to both the left side plate and the right side plate. Therefore, the rib 1115 may divide the vent hole 1114 into the multiple air sub-holes 1114A.

Optionally, there may be three ribs 1115. The three ribs 1115 are sequentially arranged in the length direction of the vent plate 1113. Meanwhile, each two adjacent ribs 1115 may be spaced apart from each other by a same spacing. A distance between one of two outermost ribs 1115 and the left side plate may be the same as a distance between the other of the two outermost ribs 1115 and the right side plate. It can be understood that the multiple air sub-holes 1114A may be the same as each other in size.

With aid of the rib 1115 in the vent hole 1114, the vent hole 1114 may be divided to form uniform air flow. Meanwhile, the rib 1115 may help to support the vent plate 1113 that defines the vent hole 1114, and may also be used to block debris.

In an embodiment, as illustrated in FIG. 7 and FIG. 8, the main body plate 111 may further include a support plate 1116. The vent plate 1113 may include a first vent plate 1113A and a second vent plate 1113B. The support plate 1116 and the first vent plate 1113A are sequentially connected in the length direction of the main body plate 111. The first vent plate 1113A and the second vent plate 1113B are in butt joint in the width direction of the main body plate 111. The second vent plate 1113B protrudes from the support plate 1116 in the width direction of the main body plate 111.

Specifically, the support plate 1116 may further include a left support plate 1116A and a right support plate 1116B. The left support plate 1116A is connected to the left side plate mentioned in the foregoing embodiments, and the right support plate 1116B is connected to the right side plate mentioned in the foregoing embodiments. Furthermore, the left support plate 1116A and the right support plate 1116B may both define the vent hole mentioned in the foregoing embodiments.

Optionally, the vent plate 1113 may be divided into the first vent plate 1113A and the second vent plate 1113B in the width direction of the vent plate 1113. The first vent plate 1113A and the second vent plate 1113B are in butt joint to define the vent hole 1114. The first vent plate 1113A may include the upper side plate, part of the left side plate, and part of the right side plate that are mentioned in the foregoing embodiments. The second vent plate 1113B may include the lower side plate, part of the left side plate, and part of the right side plate that are mentioned in the foregoing embodiments.

Optionally, the left support plate 1116A, the first vent plate 1113A, and the right support plate 1116B are sequentially connected in the length direction of the main body plate 111. The second vent plate 1113B protrudes from the support plate 1116 in the width direction of the main body plate 111. It may be understood that the vent plate 1113 may be integrally formed, and the vent plate 1113 being divided into the first vent plate 1113A and the second vent plate 1113B is mainly for ease of illustration.

The second vent plate 1113B protrudes from the support plate 1116 in the width direction of the main body plate 111, so that the vent plate 1113 may have a relatively large size, and thus the vent hole 1114 may be relatively large to improve air flow.

In an embodiment, as illustrated in FIG. 8, the second vent plate 1113B has a third surface 1117 opposite to the first surface 1111. The first wall plate 112 has a fourth surface 1123. The third surface 1117 is connected to the fourth surface 1123. A chamfer is formed between the third surface 1117 and the fourth surface 1123.

Specifically, the first vent plate 1113A may include part of the second surface 1112. The second vent plate 1113B may include part of the second surface 1112 and the third surface 1117. The third surface 1117 may be not parallel to the second surface 1112. A fifth included angle η may be defined between the second surface 1112 and the third surface 1117. The third surface 1117 is inclined downwards relative to the second surface 1112 and is used for guiding air flow.

Optionally, the fourth surface 1123 may be a surface of the first plate 1121A opposite to the second wall plate 113 mentioned in the foregoing embodiments. Hence, the fourth surface 1123 is connected to the third surface 1117, and a chamfer is formed between the third surface 1117 and the fourth surface 1123.

With aid of the chamfer formed between the fourth surface 1123 of the first wall plate 112 and the third surface 1117 of the second vent plate 1113B opposite to the first surface 1111, it may facilitate air flow below the vent plate 1113, thereby guiding air outside the receiving space 114 to circulate internally and externally through the first wall plate 112 and the second wall plate 113.

In an embodiment, the second wall plate 113 and the first wall plate 112 are in mirror symmetry with respect to a symmetry plane. Specifically, the insulation holder 11 may be of a structure in mirror symmetry, and a symmetry plane of the insulation holder 11 may be located in the middle of the insulation holder 11. For example, the insulation holder 11 may be divided into a left part and a right part by a plane that is perpendicular to the main body plate 111 and passes through the middle of the main body plate 111 positioned in the length direction of the main body plate 111, and the left part and the right part may be in mirror symmetry relative to the plane. In this case, the plane may be a symmetry plane.

Optionally, the first wall plate 112 is located at the left end, the second wall plate 113 is located at the right end, and the second wall plate 113 and the first wall plate 112 are in mirror symmetry. In addition, the protrusion 117 mentioned in the forgoing embodiments may be implemented as two protrusions 117, and the two protrusions 117 may be in mirror symmetry. The left support plate 1116A and the right support plate 1116B mentioned in the forgoing embodiments may be in mirror symmetry.

The second wall plate 113 and the first wall plate 112 may be in mirror symmetry, so that the first airflow channel 115 may be of a symmetrical structure, thereby reducing the number of molds for manufacturing the holder 11, and improving the production efficiency of components of the holder 11, and thus saving manufacturing cost.

Figure 9:
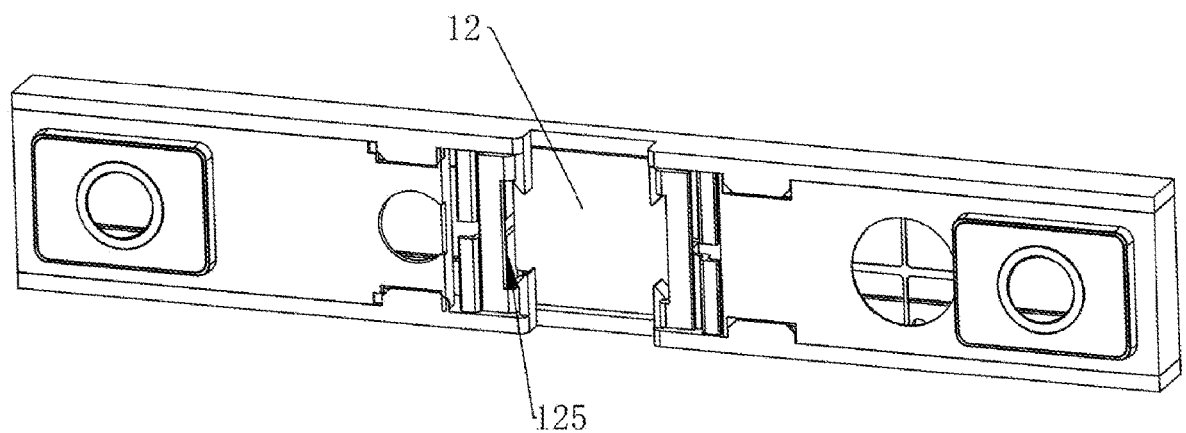
FIG. 9 is a schematic structural view illustrating an insulation holder, an insulation member, and an explosion-proof-valve holder in an embodiment.
Figure 10:
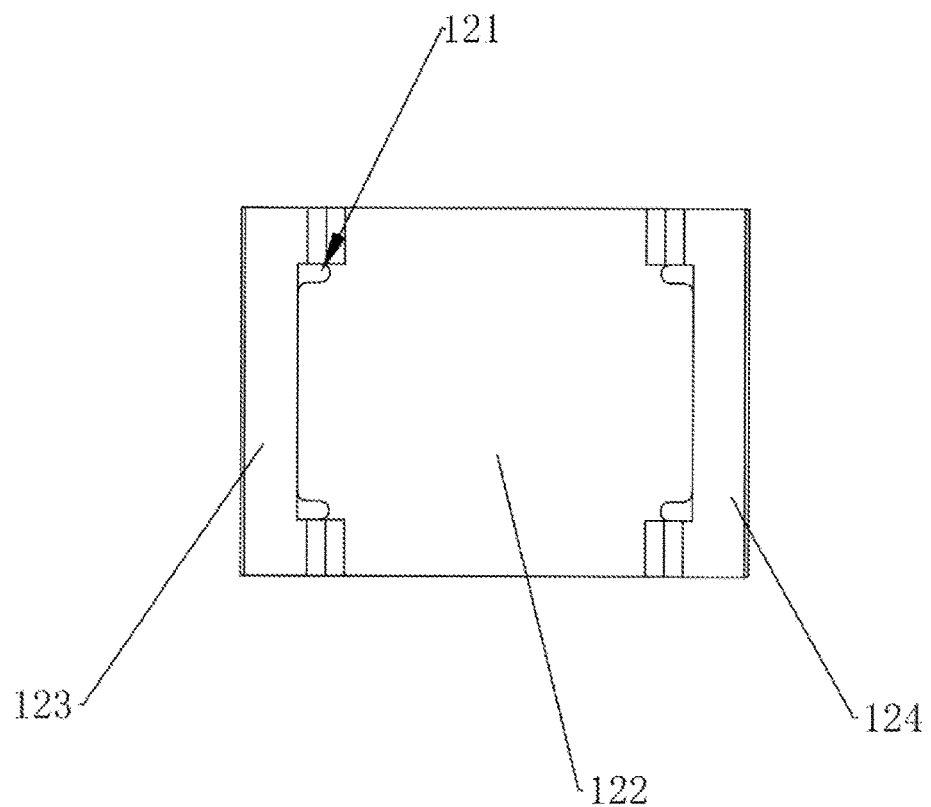
FIG. 10 is a schematic structural view of an explosion-proof-valve holder in an embodiment.

In an embodiment, as illustrated in FIGS. 7, 9, and 10, the main body plate 111 defines a first notch 118. The explosion-proof-valve holder 12 defines a second notch 121. The first notch 118 is aligned with the second notch 121 in the thickness direction of the main body plate 111.

Specifically, the left side plate mentioned in the foregoing embodiments may have a first sidewall (not illustrated), and the right side plate mentioned in the foregoing embodiments may have a second sidewall (not illustrated). The first sidewall is opposite to the second sidewall, and the first sidewall and the second sidewall jointly define the vent hole 1114. The first sidewall is at least partially recessed in the length direction of the vent plate 1113 to define one first notch 118, and the second sidewall is at least partially recessed in the length direction of the vent plate 1113 to define one first notch 118, and thus there may be two first notches 118. The two first notches 118 may both be in communication with the vent hole 1114.

Optionally, as illustrated in FIG. 10, the explosion-proof-valve holder 12 may include a baffle 122, a first connection plate 123, and a second connection plate 124. The baffle 122 faces the main body plate 111 and the main cover plate 14. The first connection plate 123 is connected to one of two opposite ends of the baffle 122 in a length direction of the baffle 122, and the second connection plate 124 is connected to the other of the two opposite ends of the baffle 122 in the length direction of the baffle 122. The first connection plate 123 and the second connection plate 124 are both further connected to the main cover plate 14.

Optionally, the explosion-proof-valve holder 12 may be of a structure in mirror symmetry, and a symmetry plane of the explosion-proof-valve holder 12 may be the same as the symmetry plane of the holder 11 mentioned in the foregoing embodiments. The cross section of the explosion-proof-valve holder 12 in the thickness direction of the main body plate 111 may be in a shape of a Chinese character "几". It may be understood that the first connection plate 123 and the second connection plate 124 may both be curved plates.

Optionally, the second notch 121 penetrates two opposite surfaces of the baffle 122 and is aligned with the first notch 118.

The main body plate 111 defines the first notch 118, the explosion-proof-valve holder 12 defines the second notch 121, and the first notch 118 is aligned with the second notch 121, so that a vertical airflow channel can be formed in the receiving space 114, thereby improving the number of channels for air convergence, and finally improving air flow density near the explosion-proof-valve holder 12.

In an embodiment, as illustrated in FIG. 7, the insulation holder 11 may further include the lateral plate 116 and a fastener 119. The lateral plate 116 is connected to one end of the main body plate 111 in the width direction of the main body plate 111. The lateral plate 116 extends in the thickness direction of the main body plate 111. The fastener 119 protrudes from the lateral plate 116 and is received in the receiving space 114. The fastener 119 is engaged with the explosion-proof-valve holder 12 to fix the insulation holder 11 with the explosion-proof-valve holder 12.

Specifically, the fastener 119 protrudes from the connection surface 1161 of the lateral plate 116 and is located in the receiving space 114. The fastener 119 may be in a shape of "1" so that the fastener 119 can be engaged with the explosion-proof-valve holder 12. Furthermore, since the insulation holder 11 has a structure in mirror symmetry, there may be two fasteners 119, and the two fasteners 119 are in mirror symmetry.

Optionally, as illustrated in FIG. 9, the explosion-proof-valve holder 12 further defines two fixing holes 125, where one of the two fixing holes 125 is defined on the first connection plate 123, and the other of the two fixing holes 125 is defined on the second connection plate 124. Since the explosion-proof-valve holder 12 has a structure in mirror symmetry, the first connection plate 123 is taken as an example. The fixing hole 125 penetrates two opposite surfaces of the first connection plate 123, and the fastener 119 at least partially extends into the fixing hole 125 to be fixedly connected to the first connection plate 123.

Optionally, the fastener 119 may be aligned with both the first notch 118 and the second notch 121 mentioned in the foregoing embodiments, so that whether the fasteners 119 are snap-fitted with the first connection plate 123 and the second connection plate 124 may be observed through the first notches 118.

By means of that the holder 11 is provided with the fastener 119, the explosion-proof-valve holder 12 may be fixed to the holder 11 via the fastener 119.

Figure 11:
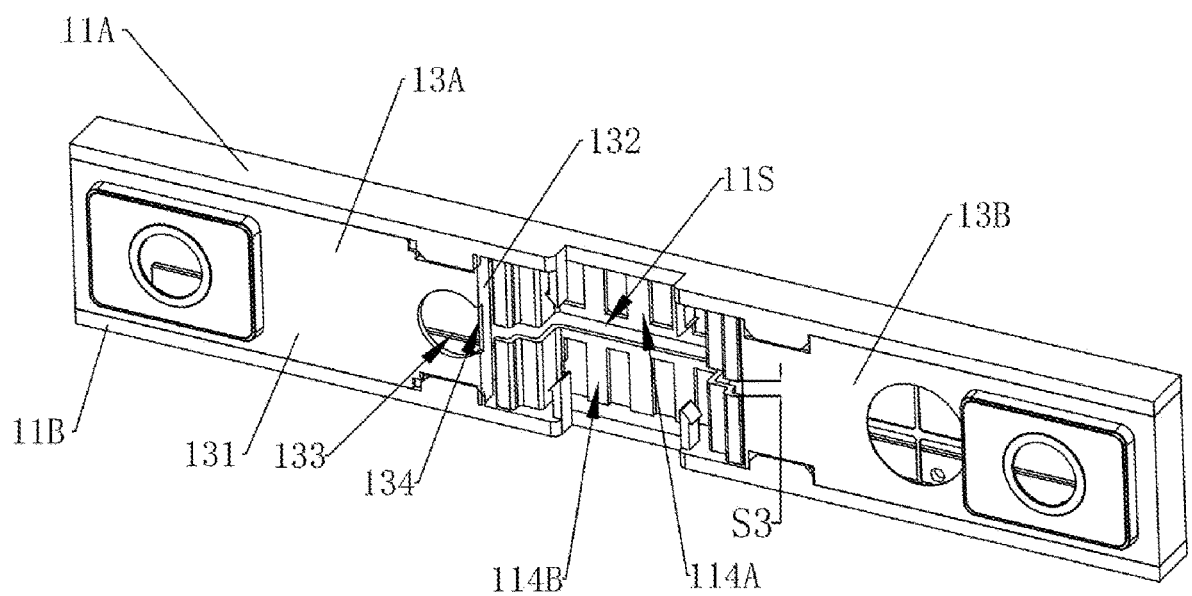
FIG. 11 is a schematic structural view illustrating an insulation holder and an insulation member in an embodiment.

In an embodiment, as illustrated in FIG. 11, the end cover assembly 10 may further include the insulation member 13. The insulation member 13 is connected to the holder 11 and may include a side plate 132 facing the explosion-proof-valve holder 12. The side plate 132 defines a third notch 134.

Specifically, the insulation member 13 may include a positive-electrode cover plate 13A and a negative-electrode cover plate 13B. The positive-electrode cover plate 13A and the negative-electrode cover plate 13B both are connected to the holder 11. The positive-electrode cover plate 13A and the negative-electrode cover plate 13B are opposite to each other in the length direction of the main body plate 111.

Optionally, the positive-electrode cover plate 13A and the negative-electrode cover plate 13B both are made of an insulation material, and may specifically be made of plastic, such as PP. The positive-electrode cover plate 13A and the negative-electrode cover plate 13B both are substantially in a shape of a plate and have a substantially rectangular plate surface. The positive-electrode cover plate 13A and the negative-electrode cover plate 13B both are consistent with the main body plate 111 in a length direction, a width direction, and a thickness direction.

Optionally, the positive-electrode cover plate 13A may include a base 131 and the side plate 132. The base 131 may be in a shape of a plate and has a rectangular plate surface. A length direction, a width direction, and a thickness direction of the base 131 are the foregoing length direction, the width direction, and the thickness direction of the positive-electrode cover plate 13A, respectively. The side plate 132 may be in a shape of a plate, a strip, a block, etc., which is not limited herein. The side plate 132 and the base 131 may be integrally formed, for example, be integrally formed through injection molding. The side plate 132 is provided at one end of the base 131 close to the negative-electrode cover plate 13B in the length direction of the base 131.

Optionally, the base 131 defines a liquid injection hole 133 in the thickness direction of the base 131. The liquid injection hole 133 is close to the side plate 132, and the side plate 132 is configured to define the liquid injection hole 133, and thus the liquid injection hole 133 has at least one straight edge.

Optionally, the side plate 132 is close to one end of the first wall plate 112 away from the main body plate 111, and the side plate 132 recesses towards a surface of the side plate 132 connected to the base 131 to define the third notch 134. The explosion-proof-valve holder 12 is located in the receiving space 114, and the third notch 134 is in communication with the first airflow channel 115.

The third notch 134 is defined on the side plate 132 of the insulation member 13 facing the explosion-proof-valve holder 12, so that the liquid injection hole 133 of the insulation member 13 may be in communication with the first airflow channel 115 through the third notch 134, thereby increasing an airflow path and improving air flow in the end cover assembly 10.

In an embodiment, as illustrated in FIG. 3 and FIG. 11, the insulation holder 11 may include a first holder 11A and a second holder 11B. The first holder 11A is connected to one of two opposite sides of the insulation member 13 in a width direction of the insulation member 13, and the second holder 11B is connected to the other of the two opposite sides of the insulation member 13 in the width direction of the insulation member 13. The first holder 11A and the second holder 11B are in mirror symmetry. The first holder 11A is spaced apart from the second holder 11B by a spacing distance to form a second airflow channel 11S. The third notch 134 faces and is in communication with the second airflow channel 11S.

Specifically, the end cover assembly 10 may include two holders 11, i.e., the first holder 11A and the second holder 11B. The first holder 11A and the second holder 11B are in mirror symmetry. Therefore, the first holder 11A and the second holder 11B both have all the features of the holder 11 mentioned in the above embodiments.

Optionally, the first holder 11A defines a receiving space 114A, and the second holder 11B defines a receiving space 114B. The receiving space 114A and the receiving space 114B together form the receiving space 114. The explosion-proof-valve holder 12 is received in the receiving space 114.

Optionally, the first holder 11A is spaced apart from the second holder 11B by a spacing distance to form the second airflow channel 11S. An extension path of the second airflow channel 11S may be the same as and faces the extension path of the second airflow channel 11S. Therefore, the second airflow channel 11S is in communication with the receiving space 114.

Optionally, the insulation member 13 is located between the first holder 11A and the second holder 11B and is connected to both the first holder 11A and the second holder 11B. The third notch 134 faces and is in communication with the second airflow channel 11S.

The insulation holder 11 includes the first holder 11A and the second holder 11B that are in mirror symmetry, so that the insulation member 13 may be fixed and the explosion-proof-valve holder 12 may be protected via the first holder 11A and the second holder 11B. Meanwhile, the second airflow channel 11S formed by the first holder 11A and the second holder 11B that are spaced apart from each other by a spacing distance may be in communication with the third notch 134, thereby increasing the number of channels for air convergence, reducing the number of molds for manufacturing the insulation holder 11, and improving the production efficiency of components of the insulation holder 11, and thus saving manufacturing cost.

In an embodiment, as illustrated in FIG. 11, the first holder 11A is spaced apart from the second holder 11B by a spacing distance S3 ranging from 0.55 mm to 5.25 mm. Specifically, the spacing distance S3 may be 1.6 mm, 1.7 mm, 1.85 mm, 1.95 mm, or 2.0 mm. With aid of the spacing distance S3 that is in the range, it may facilitate flow of air to the receiving space 114 through the second airflow channel 11S, and other foreign matters can be prevented from entering the airflow channel. In the case where the spacing distance S3 is less than 0.55 mm, the spacing is too small to form the airflow channel for air to flow freely. In the case where the spacing distance S3 is greater than 5.25 mm, the spacing is too large, and thus foreign matters in the end cover assembly 10, such as a broken tab or a broken insulation film, may easily enter the airflow channel and drift into the receiving space 114 in an airflow direction, resulting in failure of the explosion-proof valve.

Figure 12:
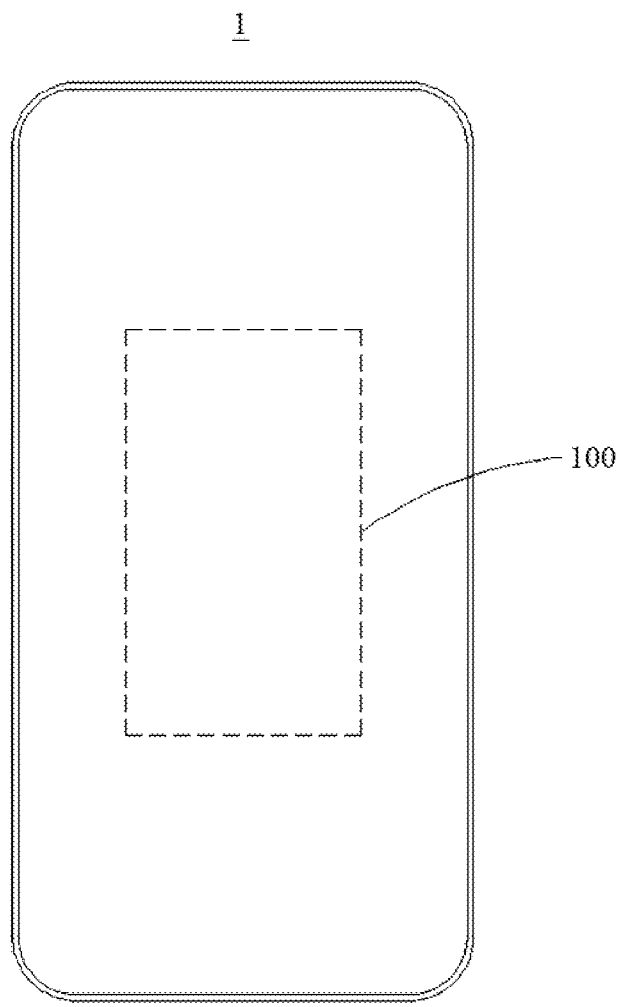
FIG. 12 is a schematic structural view of an electricity-consumption device in an embodiment.

As illustrated in FIG. 12, based on the insulation holder 11, the end cover assembly 10, and the energy-storage apparatus 100 in the foregoing embodiments of the disclosure, an electricity-consumption device 1 is further provided in embodiments of the disclosure. The electricity-consumption device 1 includes the energy-storage apparatus 100 in the embodiments of the disclosure. The energy-storage apparatus 100 is configured to power the electricity-consumption device 1.

In illustration of embodiments of the disclosure, it may need to illustrate that orientations or position relationships indicated by terms such as "center", "on", "above", "under", "below", "beneath", "left", "right", "vertical", "horizontal", "in", "inside", "out", "outside", and the like may refer to orientations or position relationships indicated in the accompanying drawings and are only for the convenience of illustration of the disclosure and simplicity of illustration, rather than explicitly or implicitly indicate that apparatuses or components referred to herein must have a certain orientation or be configured or operated in a certain orientation and therefore cannot be understood as limitations to the disclosure.

The above embodiments may be preferred embodiments of the disclosure, and may not be used to limit the scope of the disclosure. Those of ordinary skill in the field may understand all or a part of the process that realizes the above embodiments, and equivalent changes made in accordance with the claims of the disclosure still belong to the scope of the disclosure.

What is claimed is:

1. An end cover assembly for an energy-storage apparatus comprising an insulation holder and an explosion-proof-valve holder, wherein:
   the insulation holder comprises a main body plate, a first wall plate, and a second wall plate, wherein;
   the main body plate has a first surface and a second surface, the second surface faces an electrode assembly of the energy-storage apparatus, and the first wall plate and the second wall plate are provided on the first surface and opposite to each other in a length direction of the main body plate;
   the first wall plate extends away from the main body plate in a thickness direction of the main body plate, the second wall plate extends away from the main body plate in the thickness direction of the main body plate, the main body plate, the first wall plate, and the second wall plate jointly define a receiving space, the receiving space is used for receiving the explosion-proof-valve holder, and the main body plate, the first wall plate, and the second wall plate are all spaced apart from the explosion-proof-valve holder to form a first airflow channel;
   the first wall plate and the second wall plate are both spaced apart from the explosion-proof-valve holder by a spacing distance S1 ranging from 0.95 mm to 2.65 mm in the length direction of the main body plate;
   the insulation holder comprises a first holder and a second holder, wherein the first holder and the second holder are in mirror symmetry, the first holder is spaced apart from the second holder to form a second airflow channel, and the first holder is spaced apart from the second holder by a spacing distance S3 ranging from 1.6 mm to 5.25 mm; and
   the main body plate defines a vent hole, wherein an inner wall of the vent hole is recessed in the length direction of the main body plate to define a first notch; and the explosion-proof-valve holder comprises a baffle, wherein the baffle faces the main body plate and the vent hole, an edge of the baffle is recessed in the length direction of the main body plate to define a second notch, and the first notch is aligned with the second notch in the thickness direction of the main body plate.

2. The end cover assembly of claim 1, wherein the first wall plate comprises a first curved plate and a second curved plate, wherein one end of the first curved plate is connected to the first surface, another end of the first curved plate extends away from the second wall plate, one end of the second curved plate is connected to the another end of the first curved plate extending away from the second wall plate, and another end of the second curved plate extends away from the second wall plate.

3. The end cover assembly of claim 2, wherein the first curved plate comprises a first plate and a second plate connected with each other at an angle, wherein the first plate is connected to the first surface and extends in the thickness direction of the main body plate, and the second plate extends away from the second wall plate.

4. The end cover assembly of claim 2, wherein the second curved plate comprises a third plate and a fourth plate connected with each other at an angle, wherein the third plate extends in the thickness direction of the main body plate, the third plate and the first curved plate are connected with each other at an angle, and the fourth plate extends away from the second wall plate.

5. The end cover assembly of claim 1, wherein the insulation holder further comprises a lateral plate, wherein the lateral plate is connected to one end of the main body plate in a width direction of the main body plate and extends in the thickness direction of the main body plate, and the main body plate has a chamfered edge at an end away from the lateral plate.

6. The end cover assembly of claim 5, wherein the insulation holder further comprises a protrusion connected to one end of the lateral plate away from the main body plate, wherein the protrusion protrudes from the lateral plate in the width direction of the main body plate and faces the main body plate, and an orthographic projection of the protrusion on the main body plate is in a shape of a trapezoid.

7. The end cover assembly of claim 6, wherein one end of the first wall plate away from the main body plate is spaced apart from the protrusion by a spacing distance in the thickness direction of the main body plate.

8. The end cover assembly of claim 5, wherein the main body plate comprises a vent plate defining the vent hole, wherein the first wall plate is connected to one of two opposite ends of the vent plate in a length direction of the vent plate, the second wall plate is connected to the other of the two opposite ends of the vent plate in the length direction of the vent plate, the first wall plate, the second wall plate, and the vent plate jointly define the receiving space, and the vent plate is spaced apart from the explosion-proof-valve holder.

9. The end cover assembly of claim 8, wherein the main body plate is spaced apart from the explosion-proof-valve holder by a spacing distance S2 ranging from 0.25 mm to 3.45 mm.

10. The end cover assembly of claim 8, wherein the insulation holder further comprises at least one rib, wherein the at least one rib is located in the vent hole and divides the vent hole into a plurality of air sub-holes.

11. The end cover assembly of claim 8, wherein the main body plate further comprises a support plate, and the vent plate comprises a first vent plate and a second vent plate, wherein the support plate and the first vent plate are sequentially connected in the length direction of the main body plate, the first vent plate and the second vent plate are in butt joint in the width direction of the main body plate, and the second vent plate protrudes from the support plate in the width direction of the main body plate.

12. The end cover assembly of claim 11, wherein the second vent plate has a third surface opposite to the first surface, the first wall plate has a fourth surface, the third surface is connected to the fourth surface, and a chamfer is formed between the third surface and the fourth surface.

13. The end cover assembly of claim 1, wherein the second wall plate and the first wall plate are in mirror symmetry with respect to a symmetry plane.

14. The end cover assembly of claim 1, wherein the insulation holder further comprises a lateral plate and a fastener, wherein the lateral plate is connected to one end of the main body plate in a width direction of the main body plate and extends in the thickness direction of the main body plate, the fastener protrudes from the lateral plate and is received in the receiving space, and the fastener is engaged with the explosion-proof-valve holder to fix the insulation holder with the explosion-proof-valve holder.

15. The end cover assembly of claim 14, further comprising an insulation member connected to the insulation holder, wherein the insulation member comprises a side plate facing the explosion-proof-valve holder and defining a third notch.

16. The end cover assembly of claim 15, wherein the first holder is connected to one of two opposite sides of the insulation member in a width direction of the insulation member, the second holder is connected to the other of the two opposite sides of the insulation member in the width direction of the insulation member, and the third notch faces and is in communication with the second airflow channel.

17. An energy-storage apparatus comprising:
a housing;
an electrode assembly located in the housing; and
an end cover assembly electrically connected to the electrode assembly and comprising:
an explosion-proof-valve holder; and
an insulation holder comprising a main body plate, a first wall plate, and a second wall plate, wherein;
the main body plate has a first surface and a second surface, the second surface faces an electrode assembly of the energy-storage apparatus, and the first wall plate and the second wall plate are provided on the first surface and opposite to each other in the length direction of the main body plate;
the first wall plate extends away from the main body plate in a thickness direction of the main body plate, the second wall plate extends away from the main body plate in the thickness direction of the main body plate, the main body plate, the first wall plate, and the second wall plate jointly define a receiving space, the receiving space is used for receiving the explosion-proof-valve holder, and the main body plate, the first wall plate, and the second wall plate are all spaced apart from the explosion-proof-valve holder to form a first airflow channel;
the first wall plate and the second wall plate are both spaced apart from the explosion-proof-valve holder by a spacing distance S1 ranging from 0.95 mm to 2.65 mm in a length direction of the main body plate;
the insulation holder comprises a first holder and a second holder, wherein the first holder and the second holder are in mirror symmetry, the first holder is spaced apart from the second holder to form a second airflow channel, and the first holder is spaced apart from the second holder by a spacing distance S3 ranging from 1.6 mm to 5.25 mm; and
the main body plate defines a vent hole, wherein an inner wall of the vent hole is recessed in the length direction of the main body plate to define a first notch; and the explosion-proof-valve holder comprises a baffle, wherein the baffle faces the main body plate and the vent hole, an edge of the baffle is recessed in the length direction of the main body plate to define a second notch, and the first notch is aligned with the second notch in the thickness direction of the main body plate.

18. The energy-storage apparatus of claim 17, wherein the first wall plate comprises a first curved plate and a second curved plate, wherein one end of the first curved plate is connected to the first surface, another end of the first curved plate extends away from the second wall plate, one end of the second curved plate is connected to the another end of the first curved plate extending away from the second wall plate, and another end of the second curved plate extends away from the second wall plate.

19. The energy-storage apparatus of claim 18, wherein the first curved plate comprises a first plate and a second plate connected with each other at an angle, wherein the first plate is connected to the first surface and extends in the thickness direction of the main body plate, and the second plate extends away from the second wall plate.

20. An electricity-consumption device comprising:
an energy-storage apparatus configured to power the electricity-consumption device and comprising:
a housing;
an electrode assembly located in the housing; and
an end cover assembly electrically connected to the electrode assembly and comprising:
an explosion-proof-valve holder; and
an insulation holder comprising a main body plate, a first wall plate, and a second wall plate, wherein:
the main body plate has a first surface and a second surface, the second surface faces an electrode assembly of the energy-storage apparatus, and the first wall plate and the second wall plate are provided on the first surface and opposite to each other in the length direction of the main body plate;
the first wall plate extends away from the main body plate in a thickness direction of the main body plate, the second wall plate extends away from the main body plate in the thickness direction of the main body plate, the main body plate, the first wall plate, and the second wall plate jointly define a receiving space, the receiving space is used for receiving the explosion-proof-valve holder, and the main body plate, the first wall plate, and the second wall plate are all spaced apart from the explosion-proof-valve holder to form a first airflow channel;
the first wall plate and the second wall plate are both spaced apart from the explosion-proof-valve holder by a spacing distance S1 ranging from 0.95 mm to 2.65 mm in a length direction of the main body plate;
the insulation holder comprises a first holder and a second holder, wherein the first holder and the second holder are in mirror symmetry, the first holder is spaced apart from the second holder to form a second airflow channel, and the first holder is spaced apart from the second holder by a spacing distance S3 ranging from 1.6 mm to 5.25 mm; and
the main body plate defines a vent hole, wherein an inner wall of the vent hole is recessed in the length direction of the main body plate to define a first notch; and the explosion-proof-valve holder comprises a baffle, wherein the baffle faces the main body plate and the vent hole, an edge of the baffle is recessed in the length direction of the main body plate to define a second notch, and the first notch is aligned with the second notch in the thickness direction of the main body plate.

* * * * *